(12) United States Patent
Hey-Shipton

(10) Patent No.: US 6,754,510 B2
(45) Date of Patent: Jun. 22, 2004

(54) MEMS-BASED BYPASS SYSTEM FOR USE WITH A HTS RF RECEIVER

(75) Inventor: Gregory L. Hey-Shipton, Santa Barbara, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

(21) Appl. No.: 10/017,147

(22) Filed: Dec. 13, 2001

(65) Prior Publication Data

US 2004/0092243 A1 May 13, 2004

(51) Int. Cl.[7] ............................. H04B 1/38; H03F 3/04; H04M 1/00

(52) U.S. Cl. ....................... 455/561; 455/117; 455/217; 455/334

(58) Field of Search ................................. 455/561, 117, 455/217, 103, 128, 129, 66, 344, 347, 280, 282, 8, 562; 343/890; 333/99 R, 99 S, 24 R; 62/51.1, 259.2, 331; 330/289, 207 P

(56) References Cited

U.S. PATENT DOCUMENTS

| | | | |
|---|---|---|---|
| 4,565,972 A | | 1/1986 | Kaegebein |
| 5,120,705 A | * | 6/1992 | Davidson et al. ........... 505/220 |
| 5,418,490 A | | 5/1995 | Kaegebein |
| 5,995,851 A | * | 11/1999 | Lim ............................ 455/561 |
| 6,104,934 A | * | 8/2000 | Patton et al. ................ 455/561 |
| 6,124,650 A | * | 9/2000 | Bishop et al. ......... 310/40 MM |
| 6,212,404 B1 | * | 4/2001 | Hershtig ...................... 455/561 |
| 6,263,215 B1 | | 7/2001 | Patton et al. |
| 6,307,169 B1 | * | 10/2001 | Sun et al. .................... 200/181 |
| 6,622,028 B1 | * | 9/2003 | Abdelmonem et al. ..... 455/561 |
| 2002/0119805 A1 | * | 8/2002 | Smith ......................... 455/561 |
| 2002/0151332 A1 | * | 10/2002 | Eddy ........................... 455/561 |
| 2002/0173343 A1 | * | 11/2002 | Narahashi et al. .......... 455/562 |

FOREIGN PATENT DOCUMENTS

| | | |
|---|---|---|
| WO | WO 91/19348 | 12/1991 |
| WO | WO 91/19349 | 12/1991 |

OTHER PUBLICATIONS

Mark A. Robertson, "Two Applications of HTS Technology on An Airborne Platform", High–Tc Microwave Superconductors and Applications, SPIE–The International Society for Optical Engineering, Jan. 1994, pp. 13–20, vol. 2156, SPIE, Los Angeles, California.

J.L Prater, J.J. Bautista, Insertion Loss and Noise–Temperature Contribution of High–Temperature Superconducting Bandpass Filters Centered at 2.3 and 8.45 GHz, Aug. 1993 pp. 61–67, TDA Progress Report 42–114.

J.J. Bautista and S.M. Petty, "Superconducting NBTI and PB (CU) Bandpass Filters", IEEE Transactions on Magnetics, Mar. 1985, pp. 640–643, vol. Mag–21, No. 2.

Quadra™, The Fail–Safe Tower Top Amp System. An Industry First!, Quadra™, Now Your System Can Be Fail–Safe With The Ultimate Tower–Top System!, 1992, Decibel Products.

(List continued on next page.)

Primary Examiner—Vivian Chin
Assistant Examiner—Raymond B. Persino
(74) Attorney, Agent, or Firm—O'Melveny & Myers LLP

(57) ABSTRACT

A HTS-based RF receiver includes a cryocooler and a cryogenic enclosure in thermal communication with the cryocooler. The cryogenic enclosure contains a HTS filter and a LNA therein. A first MEMS bypass switch is positioned between a RF input and the HTS filter, the first MEMS bypass switch operatively coupling the RF input to the HTS filter. A second MEMS bypass switch is positioned between the LNA and RF output, the second MEMS bypass switch operatively coupling the LNA to the RF output. A bypass pathway located within the cryogenic enclosure is connected between the first and second MEMS switches to bypass the HTS filter and LNA when an operating parameter of the RF receiver falls outside a pre-determined range.

22 Claims, 4 Drawing Sheets

OTHER PUBLICATIONS

800 Mhz Tower Mounted Receiver Multicoupler Model 421–86–01–(XX), TX RX Systems Inc., Angola, NY.

SCT, Inc., "REACH™: A High–Performance Wireless Base Station Front End", 1995, pp. 1–A4–3, Superconducting Core Technologies, Inc., Golden, Colorado.

Soares, Edward R. et al., Applications of High–Temperature–Superconducting Filters and Cryo–Electronics for Satellite Communication, IEEE Transactions on Microwave Theory and Techniques, Jul. 2000, pp. 1190–1198, vol. 48, No. 7.

* cited by examiner

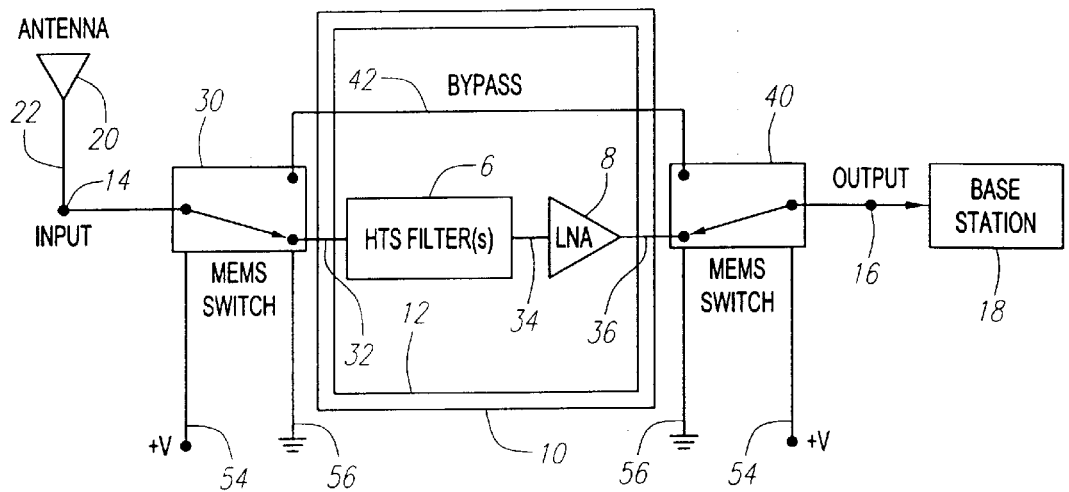
FIG. 8
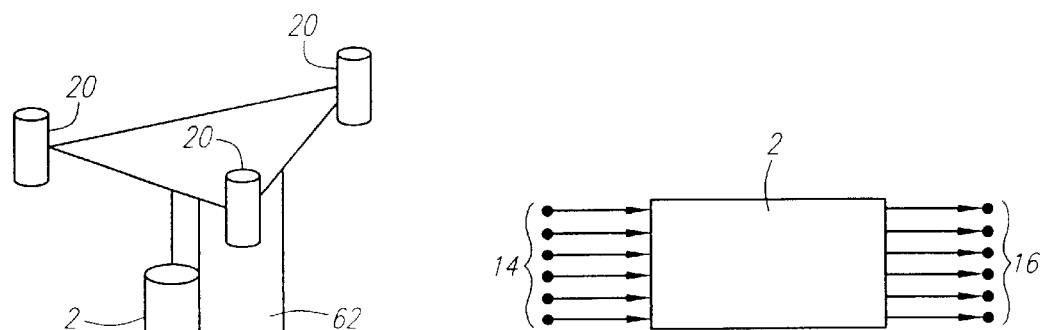
FIG. 10
FIG. 9

MEMS-BASED BYPASS SYSTEM FOR USE WITH A HTS RF RECEIVER

FIELD OF THE INVENTION

The field of the invention relates to high temperature superconducting (HTS) radio frequency (RF) filters for wireless communications. Specifically, the invention relates to a bypass system used in connection with a HTS-based filter and a cryogenically cooled low noise amplifier (LNA).

BACKGROUND OF THE INVENTION

The increase in the number of mobile telecommunication devices in recent years and the corresponding increase in the amount of data capacity required for such devices has led to the development and implementation of HTS-based RF filters used in connection with RF front-end devices. HTS filters are highly selective, low loss filters that substantially decrease interference between adjacent channels. One of the benefits of the decrease in interference between adjacent channels is the reduction of the number of calls that are dropped. This is particularly advantageous when an ever increasing number of users are occupying frequencies that are very close together. HTS-based filters also provide better mobile-to-base call quality due to the filter's increased sensitivity. Another important benefit of HTS-based front-end RF filters is that wireless providers can increase the capacity (i.e., call capacity) of existing, non HTS-based base stations. Wireless providers can also deploy wireless networks having fewer base stations when such base stations include HTS-based filters.

HTS front-end RF filters require the use of a cryocooler to cool the filters and any associated electronics, such as LNAs, to around 77K. Accordingly, it is preferable that the cryocooler used to cool the filters be able to operate for long periods of time and in a variety of environmental conditions without failing. Stirling cycle cryocoolers, for example, have been developed and used to cool HTS components for extended periods of time without interruption. In some applications, however, a bypass feature is needed in case one or more of the HTS filters contained in the RF front-end fails to perform properly, as would be the case if the cryocooler failed. It is known, for example, to include a bypass feature on a cryogenically cooled receiver front-end that uses two conventional RF relays to bypass the HTS circuitry to direct the antenna signal directly to an output that proceeds to the base station.

Bypass systems that use conventional RF relays, however, have a number of limitations. First, the conventional RF relays have a relatively high insertion loss, which degrades the overall noise figure of the RF receiver. Consequently, when the system is in bypass mode, reverse channel (i.e., mobile-to-base) coverage is reduced. Second, conventional RF relays dissipate power even in their quiescent state when operated in a fail-safe mode (i.e., if there is a power failure, the relays default to the bypass mode). Consequently, conventional RF relays must be located external to the cryogenic enclosure to avoid the relays using up the finite thermal budget of the cryocooler. Third, conventional RF relays are rather large devices that increase the overall size and weight of the RF receiver.

Accordingly, there is a need for a bypass system for an HTS-based filter/LNA RF front-end receiver that has a very low insertion loss, i.e., a very low contribution to the noise figure of the overall receiver. There also is a need for a bypass system in which the individual switching elements can be located inside the cryogenic enclosure. Accordingly, the individual switching elements need to have little or no power dissipation when switches are in their quiescent state.

SUMMARY OF THE INVENTION

In a first aspect of the invention, an HTS-based RF receiver includes a cryocooler, a cryogenic enclosure in thermal communication with the cryocooler, a RF input, and a RF output. The receiver also includes a HTS filter having an input and an output, the input of the HTS filter being operatively coupled to the RF input, the output of the HTS being coupled with a LNA, the LNA having an output that is operatively coupled the RF output. The HTS filter and the LNA are disposed within the cryogenic enclosure. A first Micro-Electro-Mechanical System (MEMS) bypass switch is provided between the RF input and the HTS filter, the first MEMS bypass switch operatively coupling the RF input to the HTS filter. A second MEMS bypass switch is provided between the LNA and the RF output, the second MEMS bypass switch operatively couples the LNA to the RF output. A bypass pathway located in the cold space of the cryogenic enclosure is connected between the first and second MEMS bypass switches.

In a second, separate embodiment, the HTS RF receiver of the first embodiment is modified such that the output of the HTS filter is operatively coupled with the LNA. The second MEMS bypass switch is positioned between the HTS filter and the LNA to operatively couple the HTS filter and LNA.

In another embodiment of the-invention, a method of bypassing a HTS filter in a RF receiver containing a HTS filter and a LNA includes the steps of measuring an operating parameter of the RF receiver, and switching the RF receiver to a bypass mode when the measured operating parameter is outside a pre-determined operating range, the step of switching the RF receiver to the bypass mode includes the step of switching two MEMS switches to a bypass pathway around the HTS filter.

In still another embodiment, the method of bypassing described above includes the step of switching two MEMS switches to a bypass pathway around the HTS filter and the LNA.

It is an object of the invention to provide a HTS-based RF receiver with a bypass capability. It is another object of the invention to provide a MEMS-based bypass solution that reduces the overall size of the device and permits the bypass switches to be placed inside a cryogenic environment. It is yet another object of the invention to provide a low insertion loss bypass system that is used with HTS-based RF receivers.

BRIEF DESCRIPTION OF THE DRAWINGS

FIG. 8 shows another preferred embodiment of the RF receiver having the first and second MEMS switches located outside the cryogenic enclosure. The first MEMS switch is disposed upstream of the HTS filter while the second MEMS switch is disposed downstream of the LNA.

FIG. 9 shows alternative embodiments of the RF receiver. In one embodiment, the RF receiver front-end is mounted atop a tower. In the other embodiment (shown in dashed lines), the RF receiver front-end is mounted substantially at ground level (i.e., at the base of the antenna tower, on the internal or external walls, or other structure, of the base station, or in an electronics rack within the base station).

FIG. 10 illustrates an RF receiver front-end having multiple inputs and outputs.

DETAILED DESCRIPTION OF THE PREFERRED EMBODIMENTS

Figure 1:
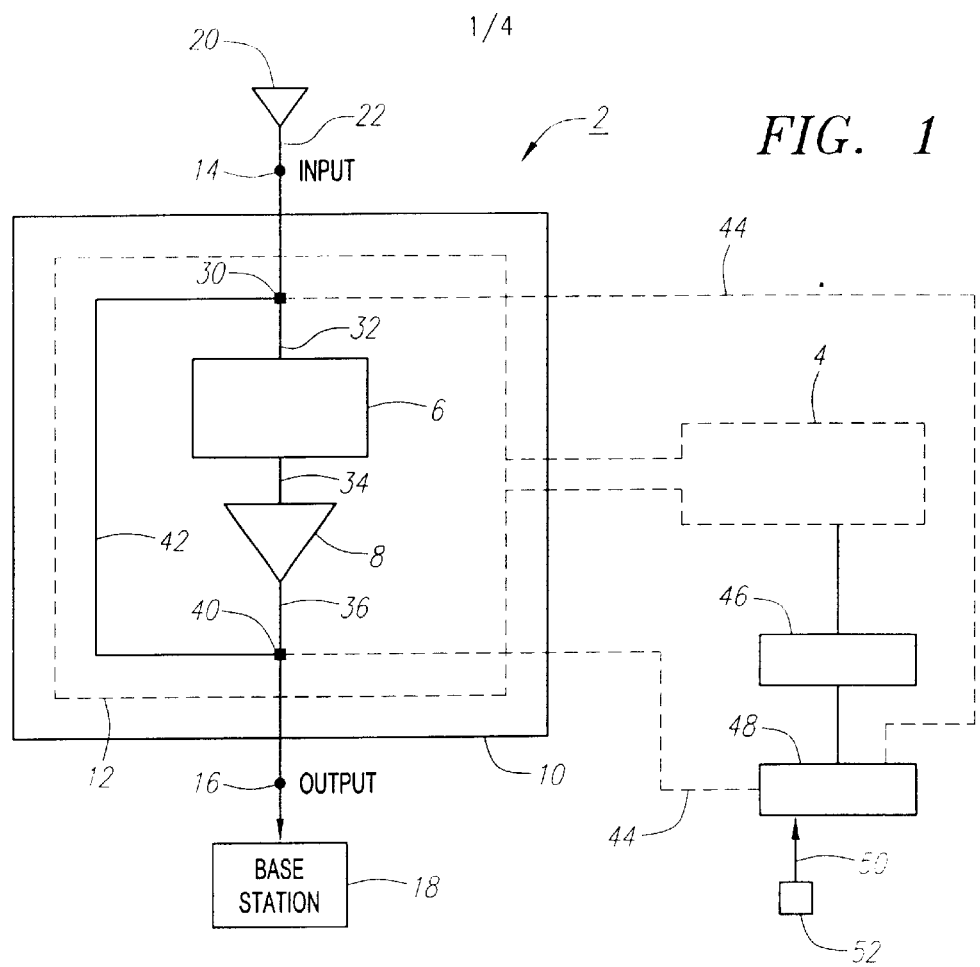
FIG. 1 is a schematic diagram of a HTS-based RF receiver according to one preferred embodiment of the invention.

FIG. 1 illustrates the HTS-based RF front-end receiver 2 according to a preferred embodiment of the present invention. The RF receiver 2 includes a cryocooler 4 that is used to cool the HTS filter(s) 6 and low noise amplifier(s) LNA(s) 8, and possibly other electronic components.

The HTS filter 6 is preferably made from a thin-film superconductor, although the present invention also contemplates other constructions such as thick-film superconductors. The thin-film superconductor may comprise a yttrium containing superconductor known generally as YBCO superconductors, or alternatively, a thallium-based superconducting compound. The invention, is not, however, limited to a particular type or class of superconductors—any HTS superconductor that will properly filter RF signals at HTS temperatures may be used.

The cryocooler 4 can be selected from a number of types of cryocoolers 4, including, by way of example, Stirling cycle cryocoolers, Brayton cycle cryocoolers, Gifford-McMahon cryocoolers, pulse tube cryocoolers, and the like. Preferably, the cryocooler 4 is a Stirling cycle cryocooler 4 since this type of cooler is reliable and highly efficient.

The cryocooler 4 is thermally coupled at its cold end to a cryogenic enclosure 10 that contains the HTS components and other electronics. The cryogenic enclosure 10 is preferably a vacuum dewar that minimizes the transfer of heat from the external environment to the inside of the cryogenic enclosure 10. A cold stage 12 is preferably located within the cryogenic enclosure 10. The cold stage 12 preferably contains thereon the HTS filter(s) 6 LNA(s) 8, as well as other electronic components used in the RF receiver 2. The cold stage 12 may have a single face or a plurality of faces to hold a number of HTS filters 6 and LNAs 8.

The RF receiver 2 includes a RF input 14, through which, the RF signal is passed. The RF receiver 2 also includes a RF output 16, through which, the filtered and amplified RF signal is passed to the base station 18. The RF input 14 is connected to an antenna 20, via a transmission line 22, which may comprise, for example, a coaxial cable or the like.

The RF input 14 is electrically coupled with a first Micro-Electro-Mechanical System (MEMS) switch 30. A MEMS switch is preferably an electrical or mechanical device wherein the switching element is fabricated using integrated circuit processing techniques with bulk and surface micromachining. Other fabrication techniques may also be used. In the embodiment shown in FIG. 1, the first MEMS switch 30 is disposed within the cryogenic enclosure 10. The first MEMS switch 30 is disposed on the cold stage 12 in FIG. 1. It should be understood, however, that when the MEMS switch 30 is disposed within the cryogenic enclosure 10, the MEMS switch 30 can be in any number of locations besides the cold stage 12 such as, for example, near an inner wall of the dewar or the like. The first MEMS switch 30 is preferably a single-pole-double-throw (SPDT) switch, as is shown in FIGS. 4–8. The MEMS switch 30 may operate using any number of actuation methods, including, for example, electrostatic actuation, electromagnetic actuation, magnetostatic actuation, pneumatic actuation, hydraulic actuation, thermal actuation, piezoelectric actuation, and the like, or a combination of such actuation methods. Preferably, the MEMS switch 30 has two stable states such that no power is consumed when the MEMS switch 30 is in the quiescent state.

Figure 2:
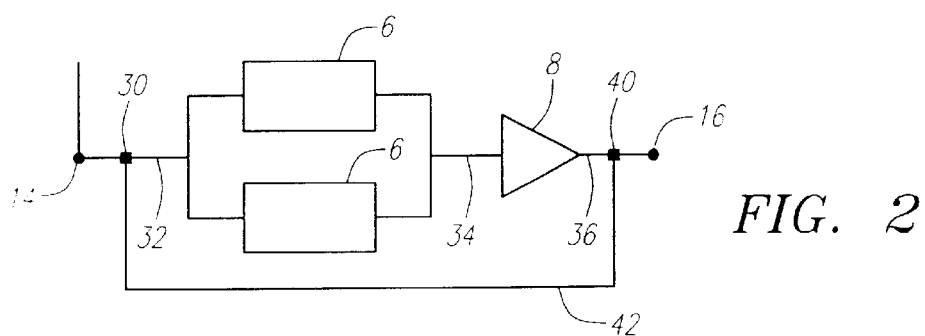
FIG. 2 illustrates a plurality of HTS filters in parallel with a low noise amplifier (LNA).
Figure 3:
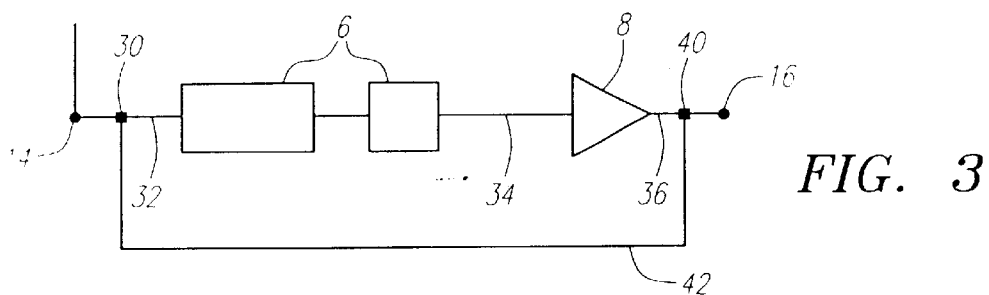
FIG. 3 illustrates a plurality of HTS filters in series with a low noise amplifier (LNA).

The first MEMS switch 30 is also connected to one or more HTS filters 6 via an input 32. In this regard, the HTS filter 6 is operatively coupled to the RF input 14 via the first MEMS switch 30. If multiple HTS filters 6 are used, the HTS filters 6 may be arranged in parallel or series, as shown, for example, in FIGS. 2 and 3. The HTS filters 6 typically comprise bandpass and/or band reject filters. The output 34 of the HTS filter 6 is coupled to the LNA 8. The LNA 8 includes an output 36 that is connected to a second MEMS switch 40.

The second MEMS switch 40, like the first MEMS switch 30, is preferably a SPDT switch. As shown in FIG. 1, the second MEMS switch 40 is disposed within the cryogenic enclosure 10. The second MEMS switch 40 can also be disposed in any number of locations within the cryogenic enclosure 10. The second MEMS switch 40 can operate using any number of actuation methods, including those identified in detail above. Similarly, the second MEMS switch 40 also has two stable states. The second MEMS switch 40 is also connected to the RF output 16. In this manner, the second MEMS switch 40 operatively couples the LNA 8 to the RF output 16.

Still referring to FIG. 1, the RF receiver 2 includes a bypass pathway 42 between the first MEMS switch 30 and a second MEMS switch 40. The bypass pathway 42 is advantageously located within the cryogenic enclosure 10. When the first and second MEMS switches 30, 40 are activated, the RF signal from the antenna 20 bypasses the HTS filter(s) 6 and LNA(s) 8. The bypass pathway 42 is preferably made of a low loss transmission line using, by way of example, a stripline, microstrip, or coaxial cable.

FIG. 1 also shows a driver 46 that is preferably used to drive the cryocooler 4 in accordance with a controller 48. The controller 48 preferably receives one or more signals 50 corresponding to a measured parameter. The measured parameter may include, for example, the temperature of the cryoenclosure 10 or cold stage 12, the current of an LNA 8, or the drive condition of the cryocooler 4. These parameters are measured by one or more sensors 52 and reported to the controller 48. The controller 48 is also preferably in communication with the first and second MEMS switches 30, 40 via control lines 44. The controller 48 is used to toggle the first and second MEMS switches 30, 40 between states to engage or bypass the HTS filter(s) 6 and LNA(s) 8. Preferably, the controller 48 switches the RF receiver 2 into a bypass mode (through the bypass pathway 42) when one or more measured operating parameters are outside a pre-determined operating range. Preferably, the pre-determined operating range is stored within the controller 48 in, for example, a memory (not shown).

FIG. 1 shows an embodiment in which the controller 48 for the cryocooler 4 also is used to control the first and second MEMS switches 30, 40. In an alternative embodiment, a separate controller 49 (as shown in FIGS. 4–8) can be used to control the first and second MEMS switches 30, 40. FIG. 1 shows controller 48 receiving signals 50 corresponding to certain measured operating parameters via sensors 52. The controller 48 may also control the cryocooler 4 using a dual-loop feedback arrangement such as that disclosed in U.S. Pat. No. 6,256,999, which is incorporated by reference as if set forth fully herein.

Figure 4:
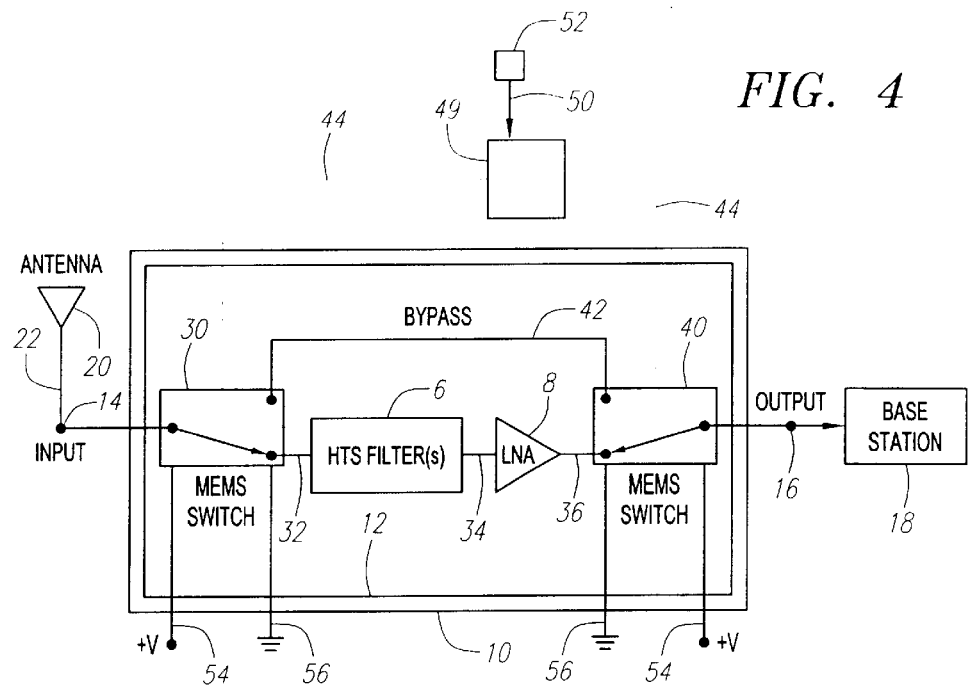
FIG. 4 shows a preferred embodiment of the RF receiver having the first and second MEMS switches located within the cryogenic enclosure. The first MEMS switch is disposed upstream of the HTS filter while the second MEMS switch is disposed downstream of the LNA.

FIG. 4 illustrates a detailed view of the cold stage 12 and MEMS switches 30, 40 of a preferred embodiment. As seen in FIG. 4, the MEMS switches 30, 40 are disposed on the cold stage 12 and within the cryogenic enclosure 10. The first and second MEMS switches 30, 40 are connected to a separate controller 49. The controller 49 preferably receives one or more signals 50 corresponding to a measured parameter such as the temperature of the cryoenclosure 10 or cold stage 12, the current of one or more LNAs 8, or the drive condition of the cryocooler 4. In MEMS switch embodiments requiring a bias voltage, or bias voltages, the first and second MEMS switches 30, 40 are also connected to a power line 54 and ground 56. The power line 54 preferably connects to a DC source (not shown) to power the MEMS switches 30, 40 as needed. Bias voltages may not be necessary depending on the actuation method used to control the MEMS switches 30, 40. The remaining aspects of this embodiment are the same as those described with respect to FIG. 1.

Figure 5:
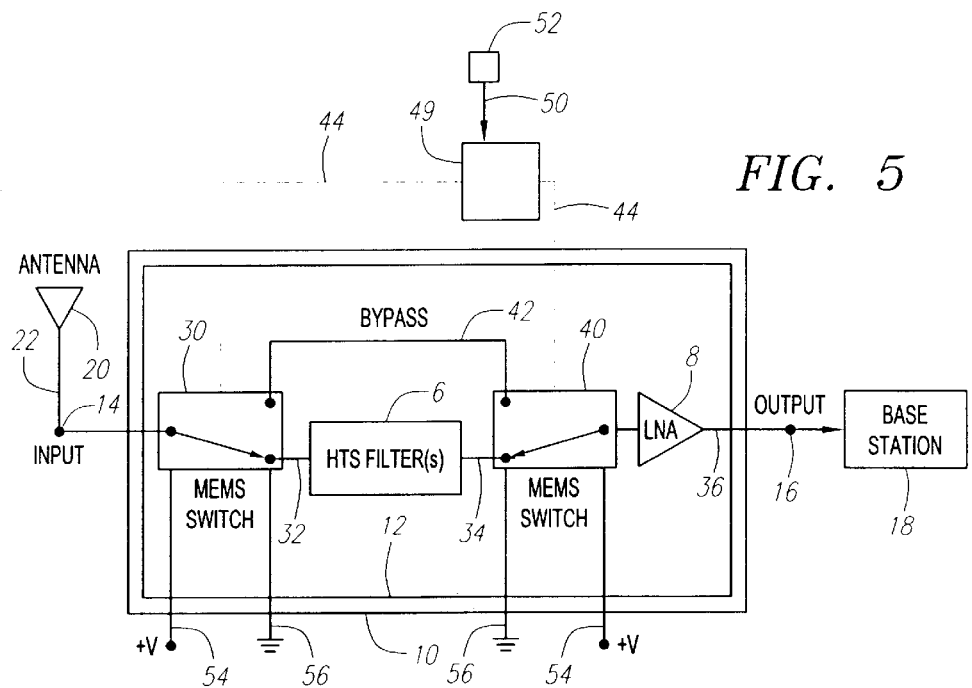
FIG. 5 shows another preferred embodiment of the RF receiver having the first and second MEMS switches located within the cryogenic enclosure. In this embodiment, the second MEMS switch is disposed upstream of the LNA and downstream of the HTS filter.

FIG. 5 illustrates an alternative embodiment in which the second MEMS switch 40 is located after the HTS filter 6 but prior to the LNA 8. The HTS filter 6 is thus operatively coupled to the LNA 8 via the second MEMS switch 40. The output 36 of the LNA 8 is coupled to the RF output 16. The remaining aspects of the RF receiver 2 shown in FIG. 5 are identical to those described with respect to the embodiment shown in FIG. 4.

Figure 6:
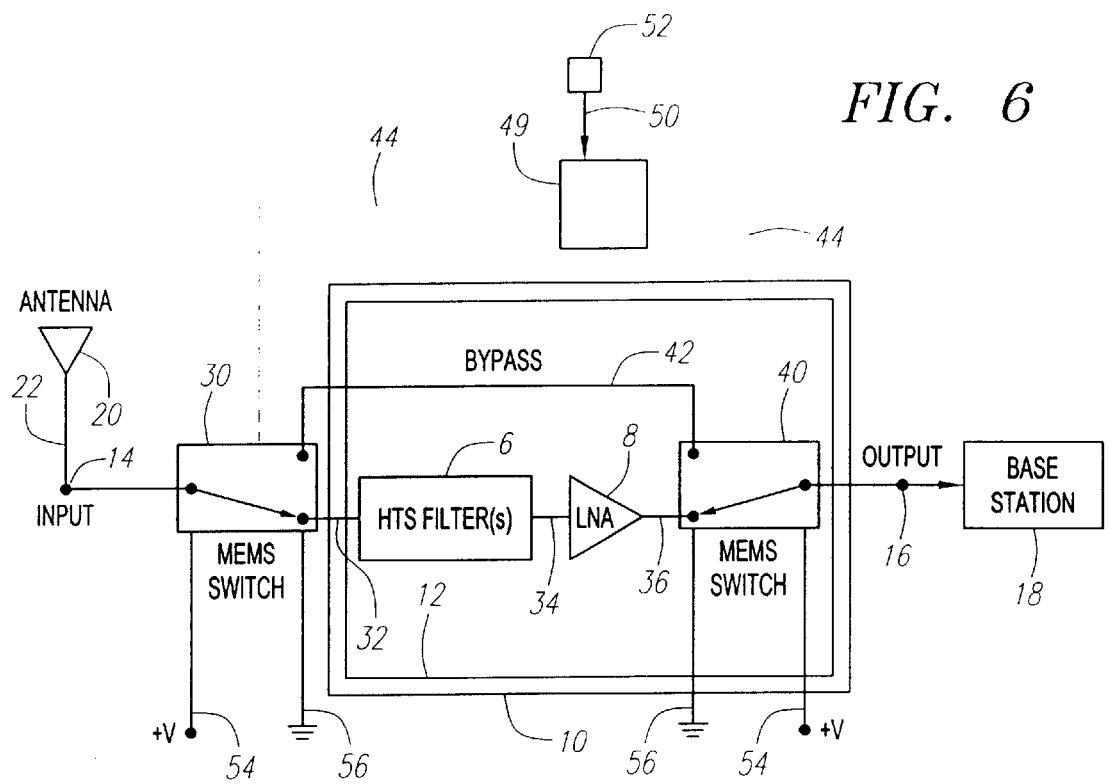
FIG. 6 shows another preferred embodiment of the RF receiver having the first MEMS switch located outside the cryogenic enclosure and the second MEMS switch located inside the cryogenic enclosure. The first MEMS switch is disposed upstream of the HTS filter while the second MEMS switch is disposed downstream of the LNA.

FIG. 6 illustrates yet another embodiment of the RF receiver 2 in which the first MEMS switch 30 is located outside the cryogenic enclosure 10. The second MEMS switch 40 is located within the cryogenic enclosure 10. The remaining aspects of this embodiment are identical to those found in the embodiment shown in FIG. 4 and described in detail above.

Figure 7:
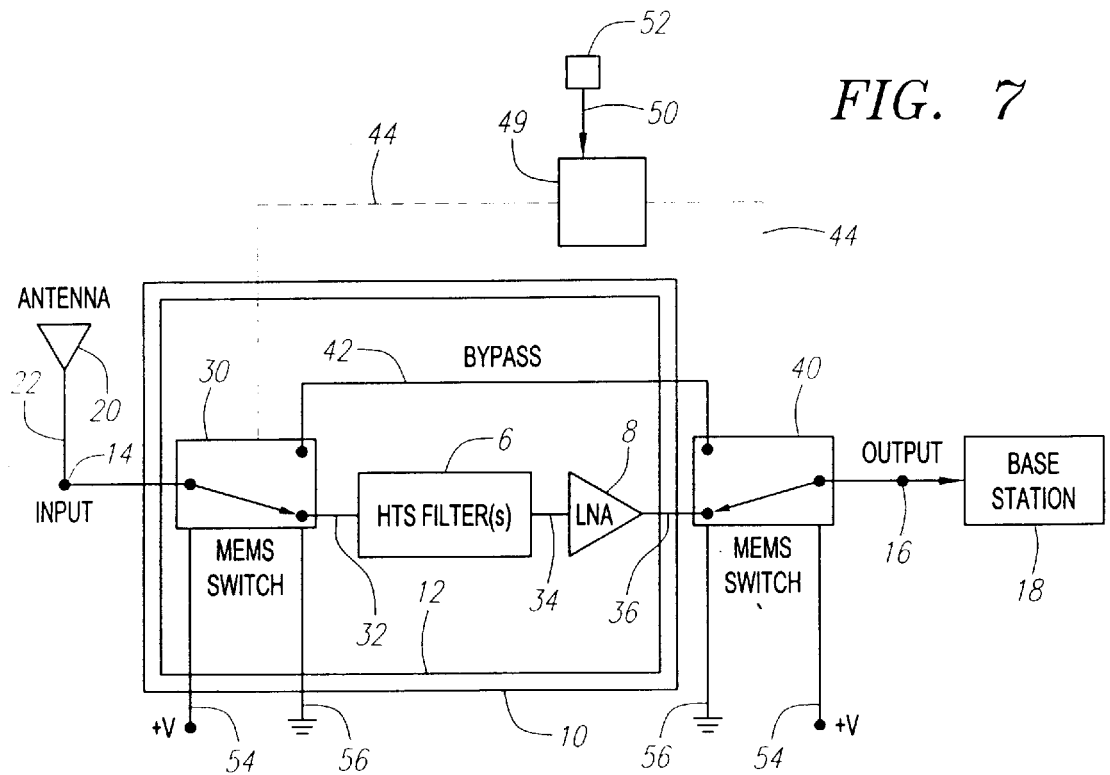
FIG. 7 shows yet another preferred embodiment of the RF receiver having the first MEMS switch located inside the cryogenic enclosure and the second MEMS switch located outside the cryogenic enclosure. The first MEMS switch is disposed upstream of the HTS filter while the second MEMS switch is disposed downstream of the LNA.

FIG. 7 illustrates still another embodiment of an HTS receiver 2 in which the second MEMS switch 40 is located outside the cryogenic enclosure 10. The first MEMS switch 30 is located within the cryogenic enclosure 10. The remaining aspects of this embodiment are identical to those found in the embodiment shown in FIG. 4 and described in detail above.

FIG. 8 illustrates still another embodiment of an HTS receiver 2 in which the first MEMS switch 30 and second MEMS switch 40 are both located outside the cryogenic enclosure 10. In addition, the bypass pathway 42 is outside the cryogenic enclosure 10. The remaining aspects of this embodiment are identical to those found in the embodiment shown in FIG. 4 and described in detail above.

FIG. 9 illustrates a tower 60 that contains a plurality of antennas 20 (typically six) that is used for uplinks and downlinks in wireless networks. FIG. 9 shows two alternative configurations for the RF receiver 2. In one configuration, the RF receiver 2 is mounted atop a tower 60. A transmission line 62 connects the output of the RF receiver 2 to the base station 18 located at the base of the tower 60. Alternatively, the RF receiver 2 may be mounted at the base of the antenna tower at substantially ground level. In this regard the RF receiver 2 may be mounted externally or internally on the walls or other structure of the base station, or internally rack-mounted, i.e., mounted near the base of the tower 60 in an electronics rack (not shown). This embodiment is shown by the dashed lines in FIG. 9. In the rack-mounted (or other) embodiments described above, a low loss transmission line 62 is preferably used to connect the antennas 20 to the HTS receiver 2.

As seen in FIG. 10, the present invention may include a plurality of RF inputs 14 for a single RF receiver 2. For example, the cold stage 12 of the cryocooler 4 may contain a plurality of HTS filters 6 and LNAs 8, with several separate. pathways for each antenna 20. Similarly, the RF receiver 2 may include a plurality of corresponding RF outputs 16.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An HTS-based RF receiver comprising:
   a cryocooler;
   a cryogenic enclosure in thermal communication with the cryocooler;
   a RF input;
   a RF output;
   a HTS filter having an input and an output, the input of the HTS filter being operatively coupled to the RF input, the output of the HTS filter being coupled with a low noise amplifier, the low noise amplifier having an output operatively coupled to the RF output, the HTS filter and the low noise amplifier being disposed within the cryogenic enclosure;
   a first MEMS bypass switch positioned between the RF input and the HTS filter, the first MEMS bypass switch disposed within the cryogenic enclosure and operatively coupling the RF input to the HTS filter;
   a second MEMS bypass switch positioned between the low noise amplifier and the RF output, the second MEMS bypass switch disposed within the cryogenic enclosure and operatively coupling the low noise amplifier to the RF output; and
   a bypass pathway connected between the first bypass switch and the second bypass switch, the bypass pathway being disposed within the cryogenic enclosure.

2. The device of claim 1, wherein the first switch and second switch are disposed on a cold stage within the cryogenic enclosure.

3. The device of claim 1, wherein the bypass pathway comprises a low loss transmission line.

4. The device of claim 1, wherein the first switch and the second switch are SPDT switches.

5. The device of claim 3, wherein the first switch and the second switch are selected such that there is no power dissipation when the first and second switches are in a quiescent state.

6. The device of claim 1, the RF input being connected to an antenna.

7. The device of claim 6, wherein the HTS-based receiver is mounted atop a tower.

8. The device of claim 6, wherein the HTS-based receiver is mounted at a base of the tower.

9. The device of claim 6, wherein the HTS-based receiver is mounted on internal or external walls, or other structure, of a base station.

10. The device of claim 6, wherein the HTS-based receiver is rack mounted within a base station.

11. The device of claim 1, further comprising a controller operatively connected to the first switch and the second switch.

12. The device of claim 11, further comprising one or more sensors operatively coupled to the controller for measuring an operating parameter of the device.

13. The device of claim 12, wherein operating parameter measured by the sensor is the temperature of the cryoenclosure.

14. The device of claim 12, wherein operating parameter measured by the sensor is the temperature of a cold stage.

15. The device of claim 12, wherein operating parameter measured by the sensor is the current of the low noise amplifier.

16. The device of claim 12, wherein operating parameter measured by the sensor is the drive condition of the cryocooler.

17. A method of bypassing a HTS filter in a RF receiver including a HTS filter and low noise amplifier connected in series and disposed within a cryogenic enclosure, the method comprising the steps of:

measuring an operating parameter of the RF receiver; and switching the RF receiver to a bypass mode when the measured operating parameter is outside a predetermined operating range, the step of switching the RF receiver to the bypass mode including the step of switching two MEMS switches disposed within the cryogenic enclosure to a bypass pathway around the HTS filter.

18. A method of bypassing a HTS filter in a RF receiver including a HTS filter and low noise amplifier connected in series and disposed within a cryogenic enclosure, the method comprising the steps of:

measuring an operating parameter of the RF receiver; and switching the RF receiver to a bypass mode when the measured operating parameter is outside a predetermined operating range, the step of switching the RF receiver to the bypass mode including the step of switching two MEMS switches disposed within the cryogenic enclosure to a bypass pathway around the HTS filter and low noise amplifier.

19. An HTS-based RF receiver comprising:

a cryocooler;

a cryogenic enclosure in thermal communication with the cryocooler;

a RF input connected to an antenna;

a RF output;

a HTS filter having an input and an output, the input of the HTS filter being operatively coupled to the RF input, the output of the HTS filter being coupled with a low noise amplifier, the low noise amplifier having an output operatively coupled to the RF output, the HTS filter and the low noise amplifier being disposed within the cryogenic enclosure;

a first MEMS bypass switch positioned between the RF input and the HTS filter, the first MEMS bypass switch operatively coupling the RF input to the HTS filter;

a second MEMS bypass switch positioned between the low noise amplifier and the RF output, the second MEMS bypass switch operatively coupling the low noise amplifier to the RF output; and a bypass pathway connected between the first MEMS bypass switch and the second MEMS bypass switch;

wherein the HTS-based receiver is mounted on internal or external walls, or other structure, of a base station.

20. An HTS-based RF receiver comprising:

a cryocooler;

a cryogenic enclosure in thermal communication with the cryocooler;

a RF input connected to an antenna;

a RF output;

a HTS filter having an input and an output, the input of the HTS filter being operatively coupled to the RF input, the output of the HTS filter being operatively coupled with a low noise amplifier, the low noise amplifier having an output coupled to the RF output, the HTS filter and the low noise amplifier being disposed within the cryogenic enclosure;

a first MEMS bypass switch positioned between the RF input and the HTS filter, the first MEMS bypass switch operatively coupling the RF input to the HTS filter;

a second MEMS bypass switch positioned between the HTS filter and the low noise amplifier, the second MEMS bypass switch operatively coupling the HTS filter to the low noise amplifier;

a bypass pathway connected between the first MEMS bypass switch and the second MEMS bypass switch, the bypass pathway being disposed within the cryogenic enclosure;

wherein the HTS-based receiver is mounted on internal or external walls, or other structure, of a base station.

21. An HTS-based RF receiver comprising:

a cryocooler;

a cryogenic enclosure in thermal communication with the cryocooler;

a RF input;

a RF output;

a HTS filter having an input and an output, the input of the HTS filter being operatively coupled to the RF input, the output of the HTS filter being coupled with a low noise amplifier, the low noise amplifier having an output operatively coupled to the RF output, the HTS filter and the low noise amplifier being disposed within the cryogenic enclosure;

a first MEMS bypass switch positioned between the RF input and the HTS filter, the first MEMS bypass switch operatively coupling the RF input to the HTS filter;

a second MEMS bypass switch positioned between the low noise amplifier and the RF output, the second MEMS bypass switch operatively coupling the low noise amplifier to the RF output;

a bypass pathway connected between the first bypass switch and the second bypass switch; and wherein the first MEMS switch is disposed within the cryogenic enclosure and the second MEMS switch is disposed outside the cryogenic enclosure.

22. An HTS-based RF receiver comprising:

a cryocooler;

a cryogenic enclosure in thermal communication with the cryocooler;

a RF input;

a RF output;

a HTS filter having an input and an output, the input of the HTS filter being operatively coupled to the RF input, the output of the HTS filter being coupled with a low noise amplifier, the low noise amplifier having an output operatively coupled to the RF output, the HTS filter and the low noise amplifier being disposed within the cryogenic enclosure;

a first MEMS bypass switch positioned between the RF input and the HTS filter, the first MEMS bypass switch operatively coupling the RF input to the HTS filter;

a second MEMS bypass switch positioned between the low noise amplifier and the RF output, the second MEMS bypass switch operatively coupling the low noise amplifier to the RF output;

a bypass pathway connected between the first bypass switch and the second bypass switch; and wherein the first MEMS switch is disposed outside the cryogenic enclosure and the second MEMS switch is disposed within the cryogenic enclosure.

* * * * *